(12) United States Patent
Bucella et al.

(10) Patent No.: US 8,552,672 B2
(45) Date of Patent: Oct. 8, 2013

(54) METHOD AND APPARATUS TO DRIVE TWO-PHASE MOTORS FROM A THREE-PHASE BRIDGE

(75) Inventors: Thomas John Bucella, Rochester, NY (US); Dave Sewhuk, Rochester, NY (US); Scott Mayne, Webster, NY (US); Warren God, Fairport, NY (US)

(73) Assignee: Teknic, Inc., Pittsford, NY (US)

( * ) Notice: Subject to any disclaimer, the term of this patent is extended or adjusted under 35 U.S.C. 154(b) by 192 days.

(21) Appl. No.: 13/274,914

(22) Filed: Oct. 17, 2011

(65) Prior Publication Data

US 2012/0091935 A1    Apr. 19, 2012

Related U.S. Application Data

(60) Provisional application No. 61/394,584, filed on Oct. 19, 2010.

(51) Int. Cl.
*H02P 6/14*        (2006.01)
(52) U.S. Cl.
USPC .............. 318/400.27; 318/400.2; 318/400.26; 318/400.29; 318/722
(58) Field of Classification Search
USPC .............. 318/400.2, 400.26, 400.27, 400.29, 318/722, 254.1, 254.2
See application file for complete search history.

(56) References Cited

U.S. PATENT DOCUMENTS

| | | | |
|---|---|---|---|
| 3,659,177 A | 4/1972 | Gelenius | |
| 3,991,355 A | 11/1976 | Reehil et al. | |
| 4,208,621 A | 6/1980 | Hipkins et al. | |
| 4,490,664 A | 12/1984 | Moriguchi | |
| 4,782,272 A | 11/1988 | Buckley et al. | |
| 4,814,677 A | 3/1989 | Plunkett | |
| 4,816,726 A * | 3/1989 | Novis et al. | 318/293 |
| 5,712,550 A * | 1/1998 | Boll et al. | 318/434 |
| 6,016,044 A | 1/2000 | Holdaway | |
| 6,229,273 B1 * | 5/2001 | Kelly et al. | 318/400.29 |
| 7,535,189 B2 * | 5/2009 | Noie | 318/400.29 |
| 7,834,565 B2 * | 11/2010 | Armstrong | 318/254.1 |
| 8,049,446 B2 * | 11/2011 | Watanabe | 318/400.02 |

* cited by examiner

*Primary Examiner* — Bentsu Ro
*Assistant Examiner* — Thai Dinh
(74) *Attorney, Agent, or Firm* — Brown & Michaels, PC

(57) ABSTRACT

A motor drive for driving two-phase motors using a three-phase bridge output stage, and a method of operating the drive. The driven two-phase motor can be a two-phase bipolar motor (such as a hybrid stepping motor). The drive can also be configured so that a single output stage can be used to drive either two-phase or three-phase motors, with or without a feedback sensor. A reference return is provided from one of the three half-bridge output stages with each of the motor phase windings connected between the reference return and one of the other half-bridge outputs. The switches of each half-bridge are modulated so that current can be controlled in each of the two motor phase windings.

11 Claims, 7 Drawing Sheets

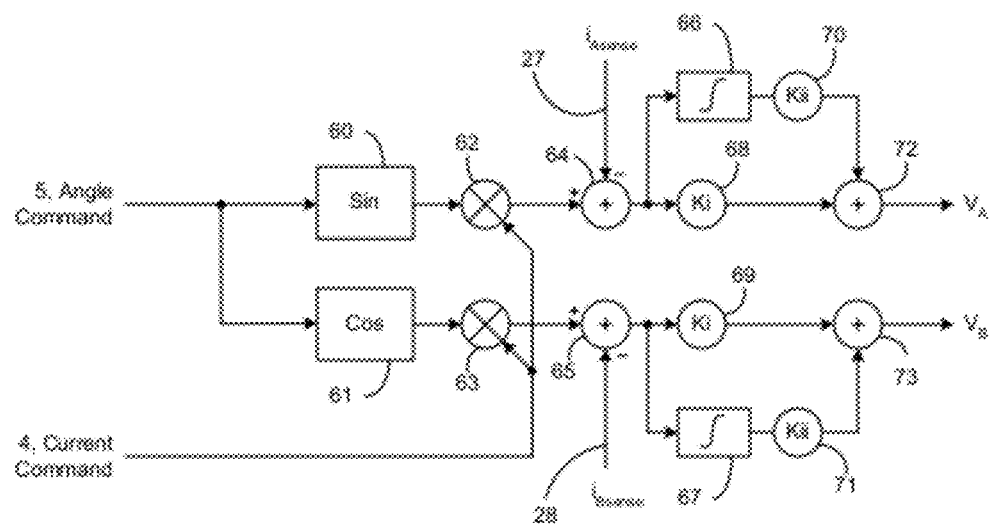
Figure 7. Prior Art, example 2-phase Voltage Calculator

METHOD AND APPARATUS TO DRIVE TWO-PHASE MOTORS FROM A THREE-PHASE BRIDGE

REFERENCE TO RELATED APPLICATIONS

This application claims one or more inventions which were disclosed in Provisional Application No. 61/394,584, filed Oct. 19, 2010, entitled "METHOD AND APPARATUS TO DRIVE TWO-PHASE MOTORS FROM A THREE-PHASE BRIDGE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of electric motor control. More particularly, the invention pertains to control of two-phase motors.

2. Description of Related Art

In many examples of automated machinery, three-phase motors and two-phase motors are used to apply kinetic power to position loads, with machine builders mixing both types within a machine or across a number of machine models. In most instances, the 3-phase motors are permanent magnet servo motors used with feedback sensors to form a closed-loop device, while the two-phase motors are permanent magnet motors used in a stepping motor configuration which, are operated in an open-loop mode. Both can be used successfully to position loads within the machine.

Two-phase motors can be used as servo motors with a feedback device, and three-phase motors can be used in an open loop stepping mode, however, worldwide there are very few examples of these. Most servo motors and their drives are three-phase and most stepper motors and drives are two-phase.

Closed loop servo motors have the advantage of higher power output, enhanced precision, and assurance of operation when compared to open loop stepper motors, while open-loop stepper motors have the advantage of lower complexity and lower installed cost.

Modern electronic drives used to power two-phase motors use two "full-bridge" output circuits containing a total of eight power switching elements, while three-phase drives use three "half-bridges" which contain a total of six power switching elements. In both cases, modern motor drives typically contain a computing processor which directs the switching of the output elements based upon a command from a machine's high-level control electronics (and the motor's feedback device, if used).

With the current technology, manufacturers of automated machines have to purchase and stock two different types of motor drives for use in their machines if they wish to take advantage of the high performance of the servo motor for their demanding movement requirements while gaining the low cost/complexity benefits of the stepper motor for their less demanding movement requirements.

It would be an improvement to have one motor drive be capable of driving either two-phase or three-phase motors without adding to the cost or complexity of the motor drive circuitry. This would allow machine builders to integrate, stock and support one motor drive type instead of two, reducing their total costs and it would also allow the motor drive manufactures to increase the number of units sold of a specific type, increasing their economy of scale. It would further be an improvement if this could be done without increasing the base cost of the motor drive electronics.

There is a need for a single electronic motor drive configurable to run either two-phase or three-phase motor loads without any significant increase in the circuitry used to manufacture such a motor drive.

How a three-phase output stage (three half-bridges) operates a three-phase servomotor is well understood and taught by many references including U.S. Pat. Nos. 4,782,272, 4,208,621, and 4,814,677. Operating a two-phase motor with two half bridges is taught by many references including U.S. Pat. Nos. 4,490,664, and 6,016,044. Driving a three-phase stepper motor is taught by many references including U.S. Pat. Nos. 3,659,177, and 3,991,355.

FIG. 1 illustrates the prevailing prior art for driving a two-phase high-power stepping motor. Shown are two full-bridge stages (6, 9) (requiring eight switching elements total—$S1_A$, $S2_A$, $S3_A$, $S4_A$, $S1_B$, $S2_B$, $S3_B$, $S4_B$) driving two independent motor phase windings (A, B) of motor (2). This configuration may drive the motor with simple on and off sequencing of the switches (often referred to as full-step mode) or by modulating the switch's duty cycle so that currents can be arbitrarily controlled in the two motor phase windings (A, B) to position a shaft of the motor (2) between steps. When the phase currents $i_A$ and $i_B$ are controlled in a sinusoidal manner this is often referred to as micro-stepping mode.

Typically, to achieve a high shaft output power and precision, the current in each motor phase winding (A, B) is monitored by current sensors (7, 8) and controlled by a 2-phase PWM current controller (10) which utilizes a 2-phase Voltage Calculator (18) to produce the desired motor phase winding voltages $V_A$ and $V_B$. $V_A$ and $V_B$ then control the full-bridge stages (6) and (9) producing switch control signals (3) via the full-bridge PWM modulators (24) and (25). In open loop (stepping) mode the current command (4) to the 2-phase PWM current controller (10) is most often constant during motor running and the angle command (5) is incremented to control the movement of the shaft of motor (2). Alternate methods to measure the currents $i_A$ and $i_B$ in the motor phase windings (A, B) may use sense resistors within the full-bridge stages (6, 9). Full voltage from the DC source (1) can be applied arbitrary to either or both motor phase windings (2) in either polarity, so the average peak-to-peak voltage across either motor phase winding can be as high as $2V_{DC}$.

FIG. 2 illustrates the prevailing prior art for driving three-phase motors. Three half-bridge output stages (13), (14) and (15) (requiring six switching elements total—$S1_R$, $S2_R$, $S1_T$, $S2_T$, $S1_S$, $S2_S$) are modulated by the 3-Phase PWM Current Controller (12) through switch control signals (11). To achieve a high shaft power from the motor (16) with minimum torque variations, the current ($i_R$, $i_S$) in the motor phase windings (R, T, S) are monitored by current sensors (7) and (8) and controlled based upon the shaft angle of the motor (16) which may be measured and fed to the Angle Command (5). (The current ($i_T$) in the non-measured T phase being calculated as the sum of the measured currents by Kirchoff's law.) When the currents are controlled sinusoidally based upon the shaft angle, the control method is referred to by those skilled in the art as sine wave drive or vector control, depending on the internal operation of the 3-Phase PWM Current Controller (12). The current command (4) is then used to control the shaft torque output.

A Voltage Calculator is herein defined as the portion of the motor current control system that is responsible for generating the output voltage demand across the motor phase windings. A Voltage Calculator generally takes inputs from the motor phase current target inputs (4) and (5) and the phase current feedback signals (27) and (28), bus current feedback, or switching element current feedback but may operate with no current feedback whatsoever. The phase current target inputs to the Voltage Calculator most often employed are the vector amplitude of the current in the motor phases (Current Command (4)) and the angle of the current (Angle Command (5)), where the angle is used to set the target distribution between the phases. It will be understood that the target inputs may take on other forms, including the independent phase current values, etc.

Methods used within the current controller for determining the phase voltage outputs are wide and varied, i.e., there are many types of Voltage Calculators (18) or (20) known to the art. The exact internal operation of the Voltage Calculator (18) or (20) does not form part of the present invention. The following is a discussion of relevant background on voltage calculation which it is believed would enable one of ordinary skill in the art to design a voltage calculator (18) or (20) without undue experimentation.

Some Voltage Calculators use sine functions of the motor shaft angle as references to be compared against the phase currents, other examples use simple switching (square wave) functions or even arbitrary functions based upon the shaft angle as current references. Motor phase voltages are calculated based upon the difference between the reference currents and the measured or estimated phase currents.

Adding to the variation, these Voltage Calculators usually use current feedback sensors (7) and (8) as shown, but may not (there are also methods to estimate phase currents from the $V_{DC}$ bus current or combinations of the individual switching element currents) or current may not even be the controlled variable in simple systems where only voltages are used.

The voltages may be calculated directly from the difference in the individual phase current (direct method) or the phase voltages may be calculated as a group (or vector) after the phase currents are transformed into a different coordinate system (indirect method). All of these methods can be mixed and matched to form a Voltage Calculator.

FIG. 7 shows a block diagram of a 2-phase Voltage Calculator as known to the prior art. Referring to FIG. 7, the angle command input (5) is processed by a sin function (60), which outputs the sine of the angle command (5). The output of sin function (60) is multiplied in multiplier (62) by the current command (4), and then the current feed back $i_{Asense}$ (27) is subtracted from it in adder (64). The output of the adder (64) is input to integrator (66) and also scaled by a constant Ki in multiplier (68). The integrator (66) output is scaled by a constant K11 in multiplier (70), and then the scaled outputs from multipliers (68) and (70) are summed in adder (72), to form motor phase winding voltage $V_A$.

Similarly, the angle command input (5) is processed by a cos function (61), which outputs the cosine of the angle command (5). The output of cos function (61) is multiplied in multiplier (63) by the current command (4), and then the current feed back $i_{Bsense}$ (28) is subtracted from it in adder (65). The output of the adder (65) is input to integrator (67) and also scaled by a constant Ki in multiplier (69). The integrator (67) output is scaled by a constant K11 in multiplier (71), and then the scaled outputs from multipliers (69) and (71) are summed in adder (73), to form motor phase winding voltage $V_B$.

It will be understood that the diagram of FIG. 7 is exemplary only, and the structure of the Voltage Calculators employed, be they for three-phase motor control or two-phase motor control, are prior art that is outside the scope of the present invention.

SUMMARY OF THE INVENTION

The invention provides a motor drive for driving two-phase motors using a three-phase bridge output stage, and a method of operating the drive. The driven two-phase motor can be a two-phase bipolar motor (such as a hybrid stepping motor). The drive can also be configured so that a single output stage can be used to drive either two-phase or three-phase motors, with or without a feedback sensor.

The present invention creates a reference return from one of the three half-bridge output stages with each of the motor phase windings connected between the reference return and one of the other half-bridge outputs.

The present invention also modulates the switches of each half-bridge so that current can be controlled in each of the two motor phase windings. For example, with both motor phase winding's current flowing in the first direction; with both motor phase winding's current flowing in the second direction; with the first motor phase winding current flowing the first direction and the second motor phase winding current flowing in the second direction; or with the first motor phase winding current flowing the second direction and the second motor phase winding current flowing in the first direction.

The present invention can be used with any two-phase current control scheme that was originally intended for use with dual full-bridge output stages by interposing a 2-3 Phase Modulation Converter between the two-phase current controller's Voltage Calculator and the three PWM modulators that control the three half bridge output stages. Interposing this 2-3 Phase Modulation Converter while connecting each of the motor phase windings between the reference return half-bridge output and one of the other half-bridge outputs allows the two-phase motor to be controlled by the three half bridges.

An advantage of this motor drive is that only six switching elements (typically transistors) can be used to drive either three-phase or two-phase motors. In the case of two-phase motors, this not only saves the cost of two switching elements by eliminating a half-bridge, but also omits the cost of the associated switching drive circuitry, interference suppression circuitry, modulation circuitry and the thermal management (heat sinks) for these switching elements.

The motor drive operates to drive a two-phase motor by a novel method of modulating the three output half-bridges, with one output coupled to one end of each of the two motor phase windings of a two phase motor. To drive three-phase motors, the two-phase Voltage Calculator and the 2-3 Modulation converter are switched out, and a three-phase Voltage Calculator of the prior art is switched in, while each half-bridge output is connected to a motor phase winding of a three-phase motor.

BRIEF DESCRIPTION OF THE DRAWING

FIG. 7 shows a block diagram of a 2-phase Voltage Calculator of the prior art.

DETAILED DESCRIPTION OF THE INVENTION

Figure 3:
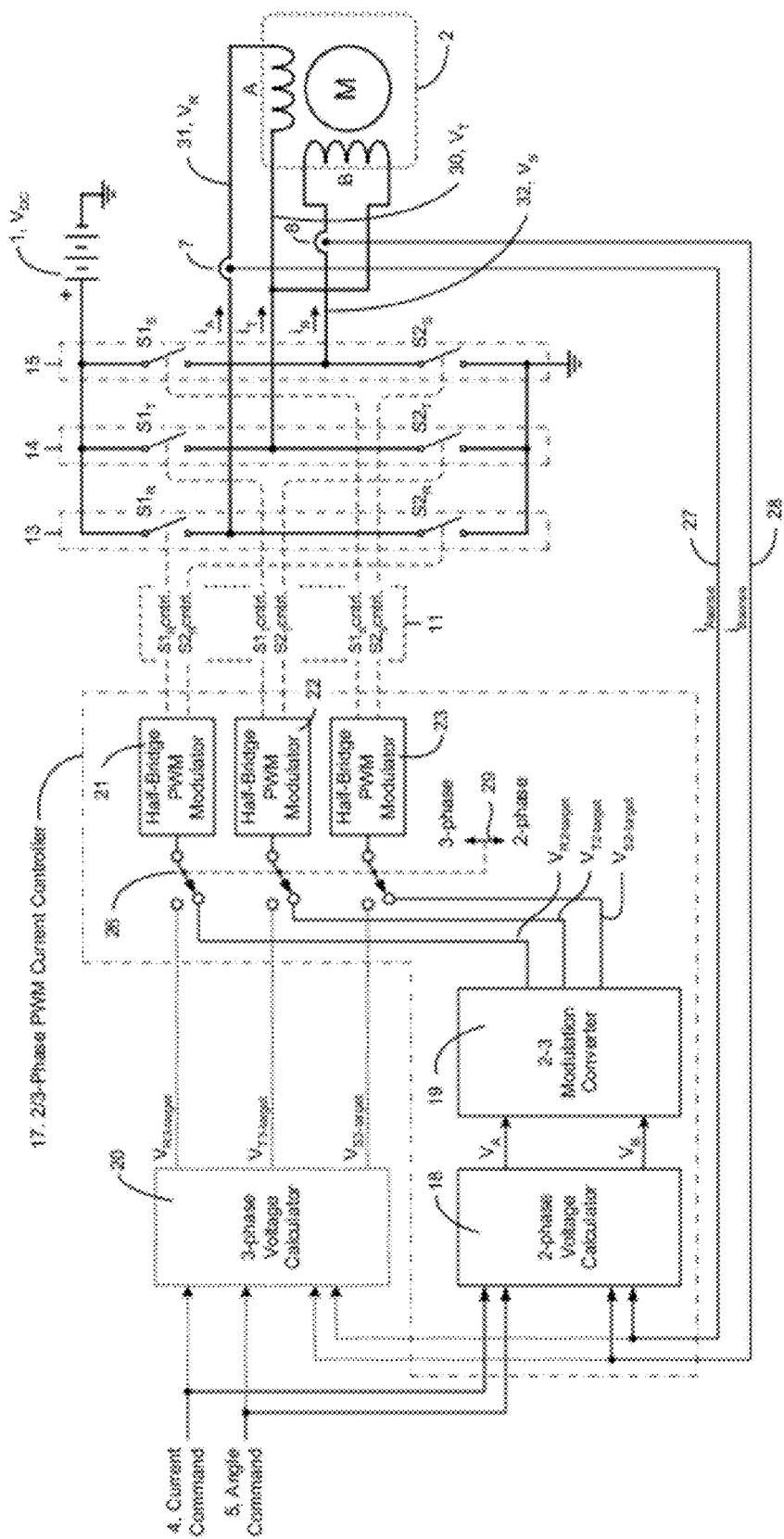
FIG. 3 shows the motor drive driving a two-phase motor.

FIG. 3 shows a motor driver according to the present invention driving a two-phase motor with three half bridges output stages, herein referred to as half-bridge. In this configuration the T half-bridge (14) is used as a reference return for both the R half-bridge (13) and the S half-bridge (15). Each half-bridge (13), (14), and (15) has an upper switch ($S1_x$) and a lower switch ($S2_x$).

Each upper switch ($S1_x$) has an input coupled to a DC voltage source ($V_{DC}$), a control input coupled to a controller (17) for receiving switch control signals (11) and an output coupled to an output of the half-bridge. When the upper switch ($S1_x$) receives a control input from the controller (17), the upper switch ($S1_x$) switches "on" to couple the output of the upper switch ($S1_x$) to the DC voltage source ($V_{DC}$).

Each lower switch ($S2_x$) has an input coupled to a DC voltage source return (also referred to as "ground"), a control input coupled to a controller (17) for receiving switch control signals (11) and an output coupled to an output of the half-bridge. When the lower switch ($S2_x$) receives a control input from the controller (17), the lower switch ($S2_x$) switches "on" to couple the output of the lower switch ($S2_x$) to the DC voltage source return.

As shown in FIG. 3, an output of the R half-bridge (13) is coupled to an end of the A motor phase winding of the motor (2), an output of the S half-bridge (15) is coupled to an end of the B motor phase winding of the motor (2), and an output of the T half-bridge (14) is coupled to a common point with the other two ends of the A and B motor phase windings. Using this configuration, the average voltage across the A motor phase winding of the motor (2) can be controlled by modulating the difference between the duty cycle of the R half-bridge (13) and the T half-bridge (14); the average voltage across the B motor phase winding of the motor (2) can be controlled by modulating the difference between the duty cycle of the S half-bridge (15) and the T half-bridge (14). The duty cycle of any half-bridge (13), (14) or (15) is defined as the on time of upper switch ($S1_x$) divided by sum of the on time of the upper switch ($S1_x$) and the on time of the lower switch ($S2_x$). ($S1_x$ is on when $S2_x$ is off and vise-versa during operation.)

The 2/3-Phase Current Controller (17), through switch control signals (11) controls the voltages across the A and B motor phase windings by modulating the differences in duty cycle between the half-bridges (13), (14) and (15) using inputs from a current command (4) and an angle command (5), and, optionally, feedback from the current sensors (7) (8) via sense signals $i_{Asense}$ (27) and $i_{Bsense}$ (28) for the A and B motor phase windings respectively of the motor (2).

The current command input (4) is used to set the reference for the "total" current in all of the motor phase windings, while the angle command input (5) determines how the current will be distributed between the motor phase windings. The controller's two-phase Voltage Calculator (18) then computes the required voltages across the motor phase windings, while the 2-3 Modulation Converter (19) calculates the duty cycles to achieve these, and finally the half-bridge PWM modulators (21), (22) and (23) modulate the output bridges in accordance with the calculated duty cycles. The 2-phase Voltage Calculator (18) can be identical to that used in the prior art, as in FIG. 1.

Figure 2:
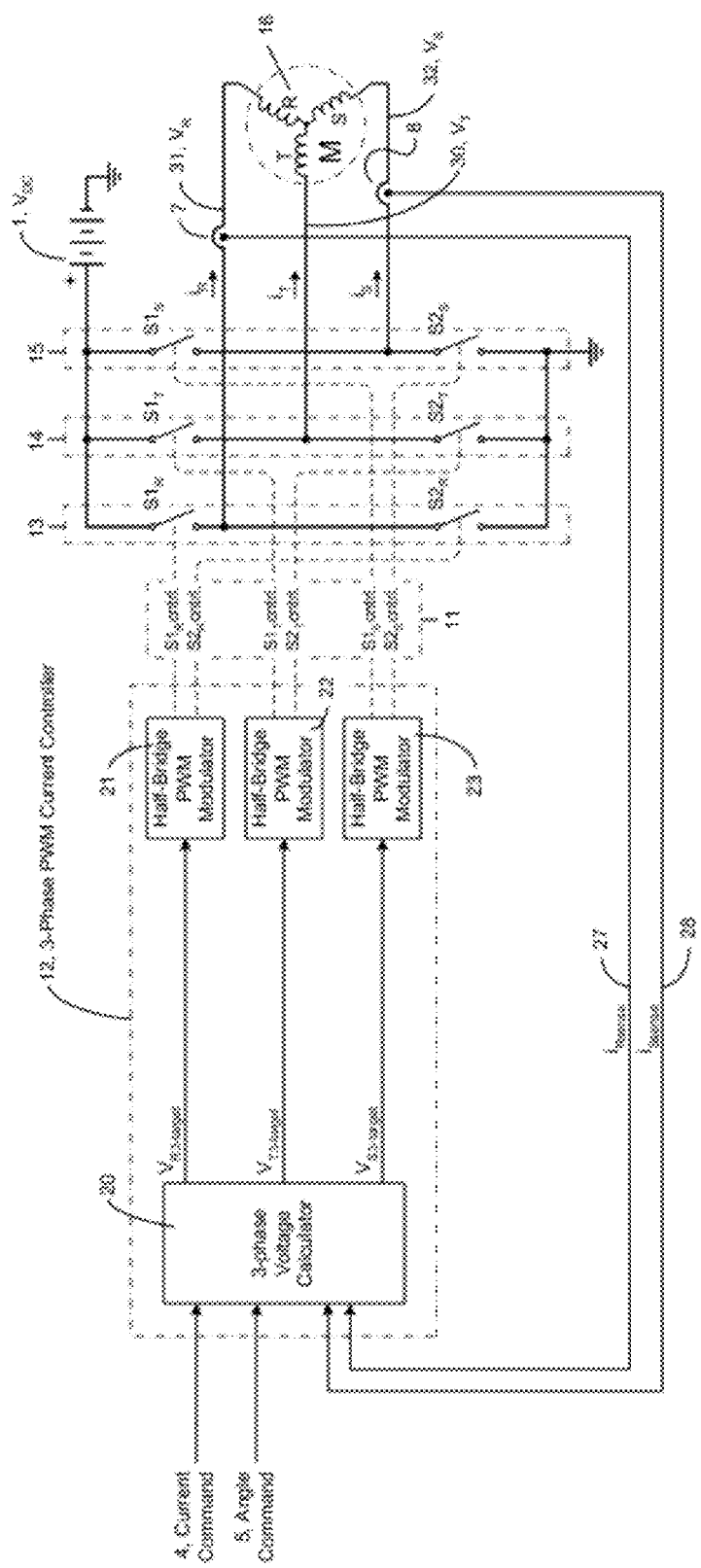
FIG. 2 shows a prior art driver for a three-phase motor.
Figure 6:
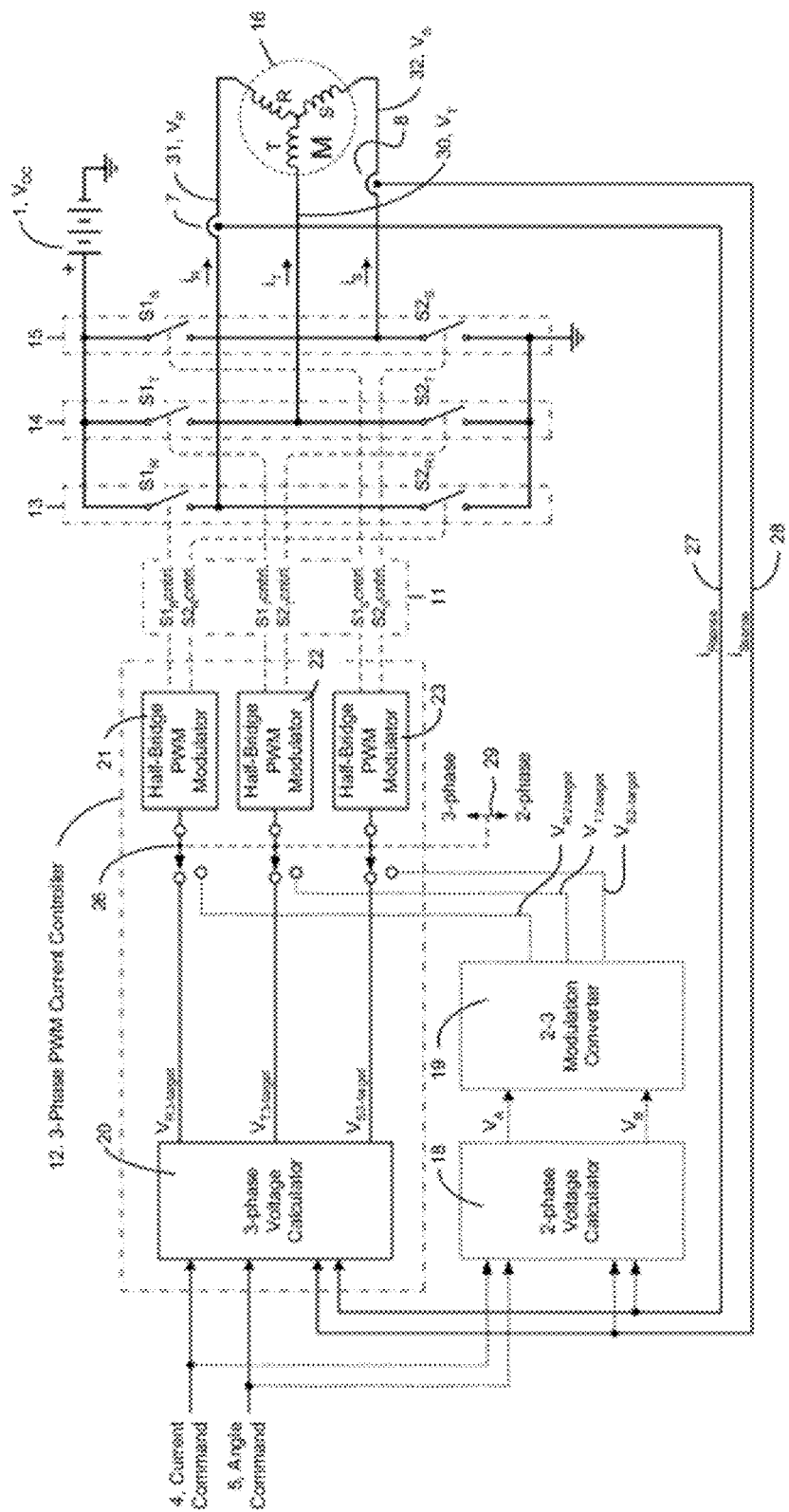
FIG. 6 shows the motor drive driving a three-phase motor.

Note that in FIG. 3 the 3-phase/2-phase signal switch (26) has been set in the 2-phase position to route the internal signals in the manner described above. FIG. 6 shows the 3-phase/2-phase switch (26) set in the 3-phase position, where the motor drive reverts to a 3-phase motor drive, using a 3-phase Voltage Calculator (20) to drive the half-bridge PWM modulators (21), (22) and (23) directly. In this case, the operation of the motor drive becomes identical to that shown in the prior art FIG. 2. The use of this scheme allows one motor drive to be used for either 2-phase or 3-phase motor control.

The Voltage Controllers (18) or (20) used to control the motor phase current may or may not use current sensors (7) (8) for feedback of motor phase currents via sense signals (27) and (28), depending on the structure and sophistication of the Voltage Calculator. Alternative methods to sense the current in the motor phase windings in either Voltage Controller (18) or (20), include the sensing of the total bus current drawn from VDC (1) and/or the currents drawn through one or more of the six switching elements (S1R), (S2R), (S1T), (S2T), (S1S), or (S2S) in half-bridges (13), (14) and (15). These alternate current measurement schemes are not shown in the figures as they are well understood in the art. Current sensors (7) and (8) for feedback of motor phase currents via sense signals (27) and (28) are used in the preferred embodiment.

It will be understood by one skilled in the art that the 3-phase/2-phase switch could be implemented as a simple bi-mode switch, or could be set by downloading a configuration file of parameters to a computer processor controlling the motor drive, in which each mode can be controlled by a bit within a parameter. In the embodiment shown in FIG. 3, this input (29), if present, would be set to configure the controller for two-phase motors. It will also be understood by one skilled in the art that the functional blocks (18), (19) and (20) to the left of the Half-Bridge modulators (21), (22) and (23) in the figures, could be implemented in dedicated digital or analog hardware, but most commonly in a modern motor drive, they would be implemented in software (firmware) in a computing processor controlling the motor drive.

One modulation method of the present invention when driving a two-phase motor is to fix the duty cycle of the T half-bridge (14) to 50%, then the average peak-to-peak voltage across motor phase winding A or B can be up to the value of the DC source, $V_{DC}$. So this modulation method retains the independent and arbitrary capability to control the current ($i_A$, $i_B$) in each A and B phase as the prior art shown in FIG. 1, with the difference that it only has half the voltage output capability of the dual full-bridge configuration shown in FIG. 1.

Figure 1:
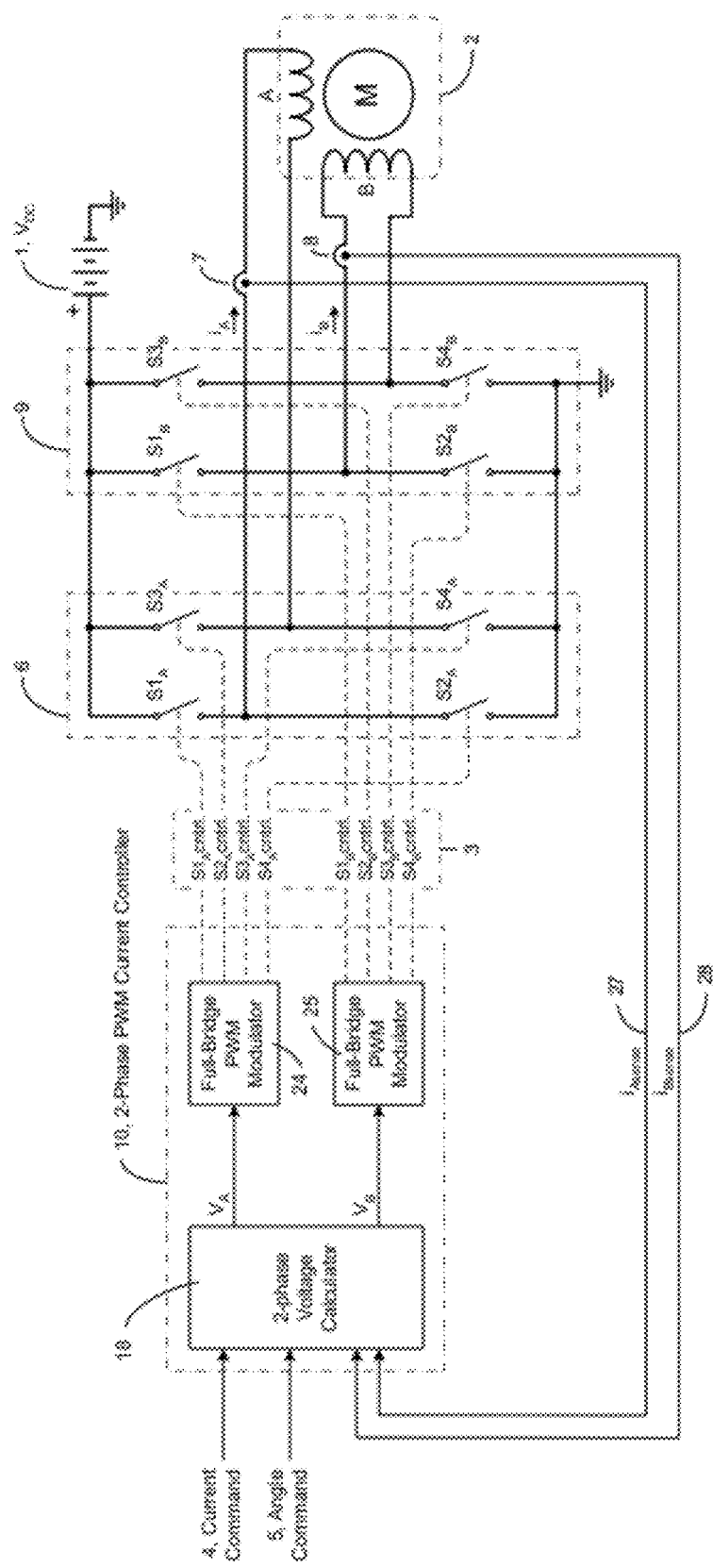
FIG. 1 shows a prior art driver for a two-phase high-power stepping motor.

In order to attain the same power from present invention as in the prior art shown in FIG. 1 the six switching elements ($S1_R$, $S2_R$, $S1_T$, $S2_T$, $S1_S$, $S2_S$) in half bridges (13-15) must have higher current capability than the eight switching elements ($S1_A$, $S2_A$, $S3_A$, $S4_A$, $S1_B$, $S2_B$, $S3_B$, $S4_B$) used in the full-bridges (6, 9) of FIG. 1; and the motor (2) motor phase windings must be wound for a lower impedance. The incremental cost of using higher current switching elements in the half-bridges (13), (14) and (15) is lower than the cost of the two additionally required switching elements and their associated support circuitry of FIG. 1. Thus, the present invention has an economic advantage over the prior art as well as the versatility advantage by allowing the same output stage to drive either a 3-phase or 2-phase motor.

A note on terminology would be appropriate at this point. It will be understood that actual voltages in the controller overall are relative to the supply voltage (1), $V_{DC}$, since that is the source of the voltage to be supplied to the motor. However, it will also be understood that inside of the controller (17) signal voltages such as $V_A$ and $V_B$ are often expressed as dimensionless numbers from −1 to +1. By the time they get to the half-bridge PWM modulators (21), (22) and (23) these are expressed as dimensionless numbers 0 to 1, which in turn are proportional to 0% to 100% duty cycle in the modulated output. The half-bridge PWM modulators (21), (22) and (23) then output the switch control signals (11) as pulsed DC signals having the selected duty cycle at the appropriate level to switch the switches $S1_R$, $S2_R$, $S1_T$, $S2_T$, $S1_S$ and $S2_S$ in half-bridges (13), (14) and (15).

The switches themselves, because they are switching $V_{DC}$ then effectively take these dimensionless numbers (actually the control signals (11), pulsed DC signals at the selected duty cycle) and make them relative to the supply (1) $V_{DC}$ by switching that supply voltage (1) in accordance with the control signals (11).

For clarity in the following discussion, the internal −1 to 1 dimensionless numbers will be expressed as percentages which range from −100% to +100%.

Figure 4:
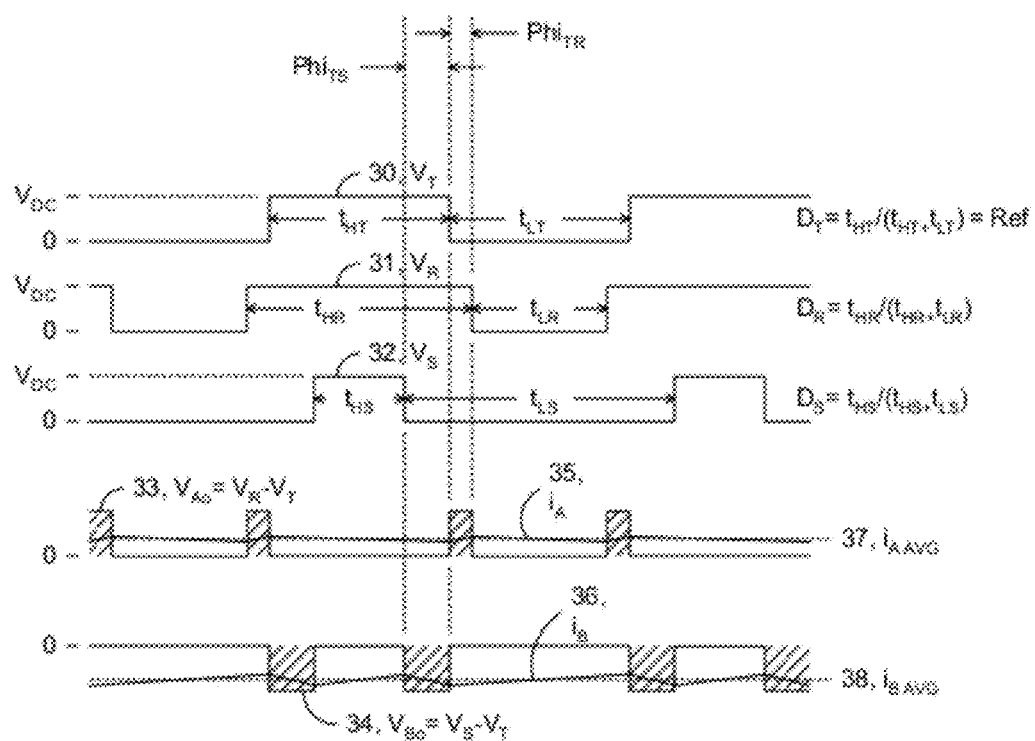
FIG. 4 shows waveform graphs of the timing, voltages and currents of the modulation method.

FIG. 4 details the timing, voltages and currents of the modulation method described above in the description of FIG. 3. The voltages $V_T$, $V_R$, $V_S$ (30), (31) and (32) are the result of the modulation of half-bridges T (14), R (13) and S (15) respectively. In FIG. 4, the time a half-bridge x is "on", or "high", is shown as $t_{hx}$, and the time the half-bridge is "off" or "low" is shown as $t_{lx}$.

When the upper switching element ($S1_x$) in a half-bridge is "on" (70), the output of the half-bridge is coupled to the source ($V_{DC}$), thus the output voltage $V_x$ is the same as the source ($V_{DC}$). When the lower switching element ($S2x$) is "on" (71), the output of the half-bridge is coupled to the DC voltage source return—that is, the output voltage is zero.

As can be seen in the graph (30) of the output voltage $V_T$ of half-bridge (14), half-bridge (14)'s duty cycle, $D_T$ is set to a fixed 50%, so that $t_{HT}$ equals $t_{LT}$. Therefore, $D_T=t_{HT}/(t_{HT}+t_{LT})$ =50%.

Half-bridge R's duty cycle $D_R$ is equal to $t_{HR}/(t_{HR}+t_{LR})$. A phase difference $Phi_{TR}$ shows the difference in phase between the start of a cycle for half-bridges T and R.

Half-bridge S's duty cycle, $D_s$ is equal to $t_{HS}/(t_{HS}+t_{LS})$. A phase difference $Phi_{TS}$ shows the difference in phase between the start of a cycle for half-bridges T and S.

Positive or negative voltage pulses can be arbitrarily set across the A and B motor phase windings by adjusting the duty cycle of half-bridge R ($D_R$) and half-bridge S ($D_S$) respectively.

The differential voltages $V_{Ao}$ and $V_{Bo}$ (33, 34) illustrated in FIG. 4 are for one example set of duty cycles ($D_R$, $D_S$, $D_T$). The average current, $I_{A\ AVG}$, (37) across motor phase winding A is proportional to [$D_R$-50%]; the average current $I_{B\ AVG}$, (38) across motor phase winding B, is proportional to [$D_S$-50%]. These motor phase winding currents $i_A$ (35) and $i_B$ (36) are shown smoothed by the inductance of the motor phase windings.

Figure 5A:
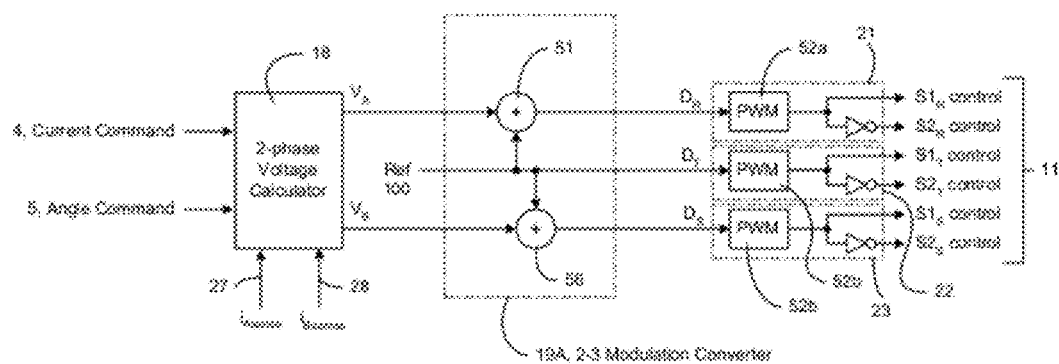
FIG. 5A is a diagram of a modulation apparatus that corresponds to the modulation waveforms shown in FIG. 4.

FIG. 5A is a diagram of a 2/3 phase PWM current control (17) of the present invention which corresponds to the modulation waveforms shown in FIG. 4. The current control (17) comprises three main components—a Voltage Calculator (18), a 2-3 modulation converter (19A) and a group of three Pulse-Width Modulation (PWM) modulators (52a) (52b) and (52c).

The desired average voltages across the motor A and B motor phase windings, $V_A$ and $V_B$ respectively, are signals provided by the phase Voltage Calculator (18) in the range of plus and minus 50%.

Any of the Voltage Calculator methods described above in the description of the prior art can be used. With all of these methods known to the art, the figures herein merely show the voltage calculator (18) as a box which accepts the inputs (4) and (5) and, optionally, $i_{Asense}$ (27) and $i_{Bsense}$ (28), and produces outputs $V_A$ and $V_B$ to drive the 2-3 Modulation Converter (19A).

The desired motor phase winding voltages $V_A$ and $V_B$ produced by the Voltage Calculator (18) are summed by summers (51) and (56) with a reference value (Ref), which in this embodiment is a fixed reference voltage. The output of summer (51), representing $V_A$ plus Ref, is sent to pulse width modulator (PWM) (52a), which generates a pulse-width modulated signal having a duty cycle of $D_R$, ranging from 0%-100% in proportion to the input of the pulse width modulator (52a). Similarly, the output of summer (56), representing $V_B$ plus Ref, is sent to pulse width modulator (PWM) (52c), which generates a pulse-width modulated signal having a duty cycle of $D_S$, ranging from 0%-100%, in proportion to the output of summer (56).

The reference voltage Ref (100), which is preferably fixed at 50%, is sent to pulse width modulator (52b) to form a signal having a 50% duty cycle $D_T$. It will be understood that different reference voltages (100) can be chosen to produce different selected duty cycles for $D_T$.

The outputs ($S_{1R}$, $S_{1T}$, $S_{1S}$) and inverted outputs ($S_{2R}$, $S_{2T}$, $S_{2S}$) of the three pulse-width modulators (52a)(52b)(52c) form the switching element control signals (11) of the controller. The outputs ($S_{1R}$, $S_{1T}$, $S_{1S}$) drive the upper switches ($S1_X$), and the inverted outputs ($S_{2R}$, $S_{2T}$, $S_{2S}$) drive the lower switches ($S2_X$).

Figure 5B:
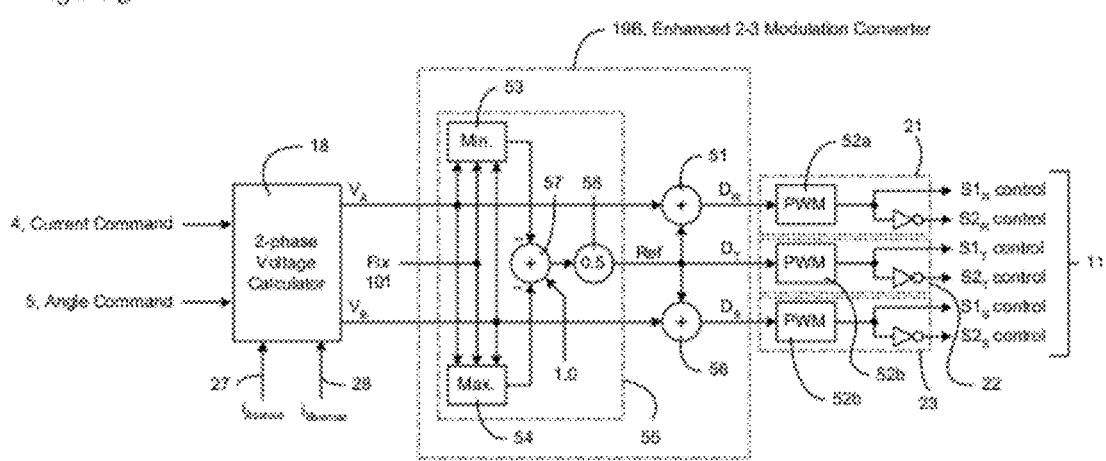
FIG. 5B shows an improved modulation apparatus that can be used with the invention that allows greater output voltages to be obtained.

FIG. 5B shows an improved modulation apparatus (17) that can be used with the invention that allows greater output voltages to be obtained by using an offset selector (55) to regulate the reference voltage (Ref) feeding PWM (52b).

As in FIG. 5A, the current control (17) comprises two main components—a Voltage Calculator (18) and a group of three Pulse-Width Modulation (PWM) modulators (52a) (52b) and (52c)—which operate as described above with respect to FIG. 5A. The description from that figure is incorporated herein by reference.

A fixed duty cycle signal (Fix) and $V_A$ and $V_B$ from the controller are received as input signals to an offset selector (55) which includes a minimum selector (53), a maximum selector (54), a summer (57) and a multiplier (58). The output of the offset selector (55) is used as the reference (Ref). For the purposes of this discussion (Fix) can be set to a selected duty cycle of 0%, although it will be understood that other values are possible.

The minimum selector (53) has inputs coupled to (Fix), $V_A$ and $V_B$, and produces as its output a duty cycle signal which is the minimum of the input signals. The same signals are coupled to the inputs of maximum selector (54), which produces as its output a duty cycle signal which is the maximum of the input signals.

A summer (57) has inverting inputs coupled to the outputs of the minimum selector (53) and the maximum selector (54), and a non-inverting input coupled to a fixed duty cycle signal (shown in the figure as 1.0, in other words 100%). The output of the summer (57) thus equals the sum of the outputs of the minimum selector and the maximum selector, subtracted from the fixed duty cycle signal. The output of the summer (57) is input to multiplier (58), where it is multiplied by a factor (here shown as 0.5 or 50%) to produce reference duty cycle signal (Ref). The rest of the controller (17) operates as described above for the embodiment of FIG. 5A.

Thus, in this example of FIG. 5B, the reference signal (Ref) shifts the duty cycles of all three half-bridges so that maximum voltage headroom is available while maintaining the duty cycle differences $D_R$-$D_T$ and $D_S$-$D_T$.

As one example, if $V_A$ and $V_B$ are 180 degree phase shifted square waves, the output voltage across the A and B motor phase windings can be as high as $2V_{DC}$ peak-to-peak (the same capability as in the two full-bridge stage of FIG. 1). As another example, when the desired $V_A$ and $V_B$ are sine and cosine voltages (typical of micro-stepping control), this allows the peak voltage across motor phase winding A or B to be up to 1.414 times $V_{DC}$. (A 40% voltage headroom increase over the modulation scheme of the apparatus shown in FIG. 5A.)

FIG. 6 shows the motor drive, driving a three-phase motor (16). The motor drive is the same as in FIG. 3, so the individual components need not be described in detail here. The 3 phase/2 phase signal switch (26), if present, would be set for three-phase motors, and in order to drive a three-phase motor, the modulation apparatus would then be configured to drive the half-bridges (13), (14) and (15) from the outputs of the 3-phase Voltage Calculator (20).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of controlling a motor drive for a two phase motor having two motor phase windings, each motor phase winding having a first end and a second end, the motor drive comprising a controller having at least one input and a plurality of outputs; a first half-bridge output stage, a second half-bridge output stage and a third half-bridge output stage, each half bridge output stage comprising: an output for coupling to a winding of a motor; a first switch having an input coupled to a DC voltage source, an output coupled to the output of the half-bridge, and a control input coupled to an output of the controller, such that a signal on the control input of the first switch couples the output of the first switch to the DC voltage source; and a second switch having an input coupled to a DC voltage source return, an output coupled to the output of the half-bridge, and a control input coupled to an output of the controller, such that a signal on the control input of the second switch couples the output of the second switch to the DC voltage source return, the method comprising:

sending control signals to the control input of the first switch of the third half-bridge and to the control input of the second switch of the third half-bridge to produce a voltage at the output of the third half-bridge with an arbitrary duty cycle;

sending control signals to the control input of the first switch of the first half-bridge and to the control input of the second switch of the first half-bridge to produce a voltage at the output of the first half-bridge with a selected duty cycle and a phase relative to the voltage at the output of the third half-bridge;

sending control signals to the control input of the first switch of the second half-bridge and to the control input of the second switch of the second half-bridge to produce a voltage at the output of the second half-bridge with a selected duty cycle and a phase relative to the voltage at the output of the third half-bridge;

modulating the phase and duty cycle of the first and second half bridge to form phase voltages to control the current in the motor phase windings of the two phase motor.

2. The method of claim 1, wherein the duty cycle of the voltage at the output of the third half-bridge is fixed at 50%.

3. The method of claim 1, further comprising the controller receiving a feedback input from a sensor on the first motor phase winding and an input from a sensor on the second motor phase winding to control the current in the first motor phase winding and the second motor phase winding of the two phase motor.

4. A motor drive for a two phase motor having a first motor phase winding and a second motor phase winding, comprising:

a phase current controller having at least one command input and a plurality of switch control signal outputs comprising:

a phase voltage calculator having at least one input coupled to the at least one command input and a plurality of motor phase voltage outputs;

a modulation converter comprising a plurality of inputs coupled to the plurality of motor phase voltage outputs of the phase voltage calculator, and a plurality of duty-cycle signal outputs;

a pulse-width modulator having a plurality of inputs coupled to the plurality of duty-cycle signal outputs of the modulation converter and a plurality of outputs coupled to the switch control signal outputs, such that the phase voltage calculator produces motor phase voltages on the motor phase voltage outputs controlled by signals on at least one command input, the modulation converter converts the motor phase voltage outputs to duty-cycle signals on the duty-cycle signal outputs, and the pulse-width modulator produces pulse-width modulated switch drive signals on the plurality of switch control signal outputs having duty cycles controlled by the duty-cycle signals on the plurality of inputs of the pulse-width modulator;

a first half-bridge output stage, a second half-bridge output stage and a third half-bridge output stage, each half bridge output stage comprising:

an output for coupling to a motor phase winding of a motor;

a first switch having an input coupled to a DC voltage source, an output coupled to the output of the half-bridge, and a control input coupled to a switch control signal output of the controller, such that a signal on the control input of the first switch couples the output of the first switch to the DC voltage source; and a second switch having an input coupled to a DC voltage source return, an output coupled to the output of the half-bridge, and a control input coupled to a switch control signal output of the controller, such that a signal on the control input of the second switch couples the output of the second switch to the DC voltage source return;

wherein when the output of the first half-bridge is coupled to a first end of the first motor phase winding of the two phase motor, the output of the second half-bridge is coupled to a first end of the second motor phase winding of the two phase motor, and the output of the third half-bridge is coupled to a common point coupled to the second ends of the first motor phase winding and the second motor phase winding, the controller controls the outputs of the controller coupled to the half-bridges such that:

an average voltage across the first motor phase winding of the motor is controlled by modulating the difference between a duty cycle of the output of the first half-bridge and the output of the third half-bridge, and an average voltage across the second motor phase winding of the motor is controlled by modulating a difference between the duty cycle of the output of the second half-bridge and the output of the third half-bridge.

5. The motor drive of claim 4, in which the phase current controller further comprises a first input coupled to a first sensor sensing current in the output of the first half-bridge and a second input coupled to a second sensor sensing current in the output of the second half-bridge, and wherein current in the first motor phase winding and second motor phase winding of the two phase motor is controlled in response to current sensed by the first sensor and the second sensor.

6. The motor drive of claim 4, in which the at least one command input of the phase current controller comprises a current command input, and the phase current controller sets a reference for a total current in all motor phase windings based on the current command input.

7. The motor drive of claim 6, in which the at least one command input of the phase current controller comprises an angle command input, and the phase current controller determines how the total current will be distributed between the motor phase windings of the motor.

8. The motor drive of claim 4, wherein the duty cycle of the output of the third half-bridge is 50%.

9. The motor drive of claim 4, wherein the modulation converter of the phase current controller comprises:
   a first summer having an input coupled to a first duty-cycle signal output of the voltage calculator, an input for a reference voltage, and an output equal to the sum of the first voltage and the reference voltage;
   a second summer having an input coupled to a second duty-cycle signal output of the voltage calculator, an input for a reference voltage and an output equal to the sum of the second voltage and the reference voltage;
   a first pulse-width modulator having a control input coupled to the output of the first summer, an output being pulse width modulated in proportion to the input, and an inverted output being inverted from the output, the output of the first pulse-width modulator forming the switch control signal output coupled to the control input of the first switch of the first half bridge and the inverted output forming the switch control signal output coupled to the control input of the second switch of the first half bridge;
   a second pulse width modulator having a control input coupled to the output of the second summer, an output being pulse width modulated in proportion to the input, and an inverted output being inverted from the output, the output of the second pulse-width modulator forming the switch control signal output coupled to the control input of the second switch of the second half bridge and the inverted output forming the switch control signal output coupled to the control input of the second switch of the second half bridge; and
   a third modulator having a control input coupled to the reference voltage, an output being pulse width modulated in proportion to the input, and an inverted output being inverted from the output, the output of the third pulse-width modulator forming the switch control signal output coupled to the control input of the third switch of the third half bridge and the inverted output forming the switch control signal output coupled to the control input of the third switch of the third half bridge.

10. The motor drive of claim 9, wherein the reference voltage is a fixed voltage.

11. The motor drive of claim 9, wherein the reference voltage is determined by an offset selector comprising:
   a minimum selector having a first input coupled to a first duty-cycle signal output of the voltage calculator, a second input coupled to a second duty-cycle signal output of the voltage calculator, a third input coupled to a fixed duty cycle value, and an output; the minimum selector setting the output to a voltage which is a minimum of the voltages at the first input, the second input and the fixed input;
   a maximum selector having a first input coupled to the first duty-cycle signal output of the voltage calculator, a second input coupled to the second duty-cycle signal output of the voltage calculator, a third input coupled to a fixed duty cycle value, and an output; the minimum selector setting the output to a voltage which is a maximum of the voltages at the first input, the second input and the fixed input;
   a summer having a first inverting input coupled to the output of the maximum selector, a second inverting input coupled to the output of the minimum selector, a reference input coupled to a fixed voltage, and an output, wherein the output of the summer is a voltage equal to a sum of the voltages at the first input, the second input and the reference inputs;
   a multiplier having an input coupled to the output of the summer and an output equal to the voltage at the output of the summer multiplied by a factor, the output of the multiplier being coupled to the control input of the third pulse-width modulator.

* * * * *